US007249653B2

(12) United States Patent
Sheng et al.

(10) Patent No.: US 7,249,653 B2
(45) Date of Patent: Jul. 31, 2007

(54) ACOUSTIC ATTENUATION MATERIALS

(75) Inventors: Ping Sheng, East Point (HK); Man Tse, East Point (HK); Che Ting Chan, East Point (HK); Xi Xiang Zhang, East Point (HK); Zongjin Li, East Point (HK); Nelson Cue, East Point (HK); Weijia Wen, East Point (HK)

(73) Assignee: RSM Technologies Limited, Tseung Kwan O (HK)

( * ) Notice: Subject to any disclaimer, the term of this patent is extended or adjusted under 35 U.S.C. 154(b) by 0 days.

(21) Appl. No.: 10/837,054

(22) Filed: May 3, 2004

(65) Prior Publication Data

US 2005/0000751 A1 Jan. 6, 2005

Related U.S. Application Data

(63) Continuation of application No. 09/964,529, filed on Sep. 28, 2001, now abandoned.

(51) Int. Cl.

*E04B 1/84* (2006.01)
*F16F 7/104* (2006.01)
*F16F 15/02* (2006.01)
*E04B 1/82* (2006.01)
*E04B 2/02* (2006.01)
*F16F 7/01* (2006.01)

(52) U.S. Cl. ........................ 181/290; 181/207; 181/209

(58) Field of Classification Search ................ 181/290, 181/295, 285, 286, 207, 209; 52/144, 145; 428/328

See application file for complete search history.

(56) References Cited

U.S. PATENT DOCUMENTS

| | | | | |
|---|---|---|---|---|
| 3,399,103 A | * | 8/1968 | Salyer et al. | 428/116 |
| 3,424,270 A | * | 1/1969 | Hartman et al. | 181/290 |
| 3,652,360 A | * | 3/1972 | Hartman et al. | 181/290 |
| 3,658,635 A | * | 4/1972 | Eustice | 181/290 |
| 3,894,169 A | * | 7/1975 | Miller | 181/207 |
| 4,056,161 A | * | 11/1977 | Allen, Jr. | 181/290 |
| 4,248,325 A | * | 2/1981 | Georgopoulos | 181/284 |
| 4,386,676 A | * | 6/1983 | Gadde et al. | 181/290 |
| 4,515,239 A | * | 5/1985 | Blatt et al. | 181/290 |
| 4,766,028 A | * | 8/1988 | Rich | 442/58 |
| 4,923,034 A | * | 5/1990 | Okuzawa et al. | 181/207 |
| 5,304,415 A | * | 4/1994 | Kurihara et al. | 428/328 |
| 5,356,702 A | * | 10/1994 | Harrison | 181/290 |
| 5,400,296 A | * | 3/1995 | Cushman et al. | 181/284 |
| 5,536,910 A | * | 7/1996 | Harrold et al. | 181/290 |
| 5,635,562 A | * | 6/1997 | Malcolm | 428/138 |
| 5,744,763 A | * | 4/1998 | Iwasa et al. | 181/286 |
| 6,110,985 A | * | 8/2000 | Wheeler | 521/83 |

FOREIGN PATENT DOCUMENTS

| | | | |
|---|---|---|---|
| JP | 01247656 A | * | 10/1989 |
| JP | 02137783 A | * | 5/1990 |

* cited by examiner

*Primary Examiner*—Edgardo San Martin
(74) *Attorney, Agent, or Firm*—Buchanan Ingersoll & Rooney PC

(57) ABSTRACT

Acoustic attenuation materials are described that comprise outer layers of a stiff material sandwiching a relatively soft elastic material therebetween, with means such as spheres, discs or wire mesh being provided within the elastic material for generating local mechanical resonances that function to absorb sound energy at tunable wavelengths.

13 Claims, 5 Drawing Sheets

ACOUSTIC ATTENUATION MATERIALS

This application is a continuation of application Ser. No. 09/964,529 filed Sep. 28, 2001 now abandoned, the entire contents of which are incorporated herein by reference.

FIELD OF THE INVENTION

This invention relates to novel materials for attenuating sound, and in particular to such materials that are able to attenuate low frequency sounds without requiring excessive size or thickness.

BACKGROUND OF THE INVENTION

The general increase in noise in many environments, both at work and at home, means that noise is becoming a significant source of pollution, and a factor that can harm both the physical and mental health of many people who are exposed to unwanted noise for prolonged periods. Noise reduction techniques and materials are therefore becoming of increasing importance.

Noise reduction can be achieved by either active methods, such as electronically generated noise cancellation techniques, or by passive techniques such as simple barriers. Most passive barriers, such as those made of fibres or acoustic foam, attenuate the sound by forcing the sound waves to change direction repeatedly. With each change of direction a portion of the energy of the sound wave is absorbed (and is in fact converted to heat). Such materials tend to be relative lightweight and are quite effective at attenuating noise at medium and higher frequencies, such as for example about 500 Hz and above.

Passive barrier are less effective however, at lower frequencies. A particular problem for example is illustrated by the so-called “mass law” which requires the thickness of the barrier material to be in inverse proportion to the frequency of the sound. As an example, it takes five times more mass of material to be an effective barrier at 200 Hz than it does at 1000 Hz. A concrete wall, for example, must be about 30 cm thick to be an effective barrier at 150 Hz. This increase in thickness and weight means that simple barrier structures are not effective in practical terms for attenuating low frequency sounds. Attempts to design suitable barrier structures for low frequency sounds include, for example, the use of an air-space between two rigid panels. The amount of low-frequency attenuation depends on the spacing between the panel and thus this design again results in a physically large barrier.

PRIOR ART

An example of a prior design for a material for acoustic attenuation is described in U.S. Pat. No. 5,400,296 (Cushman et al). In Cushman et al particles are embedded in a matrix material, the particles including both high and low characteristic acoustic impedance particles. The idea in Cushman et al is that by creating such an impedance mismatch, a portion of the impinging acoustic energy is reflected and thus the energy transmitted is attenuated.

SUMMARY OF THE INVENTION

According to the present invention there is provided an acoustic attenuation material comprising outer layers of a stiff material sandwiching a relatively soft elastic material therebetween, and wherein means are provided within said elastic material for generating local mechanical resonances.

Preferably the resonance generating means comprises a rigid material located within the elastic material, and the rigid material has a volume filling ratio within the elastic material of from about 5% to 11%.

One example of a rigid material is a plurality of individual solid particles located within the elastic material. These solid particles may be any suitable shape such as spheres or discs.

Another possibility is that the rigid material may comprise a wire mesh. Such a mesh is preferably generally planar and the wire mesh lies in the plane of the material. In one embodiment means are provided for supporting the mesh within the elastic material, for example the material may include a surrounding frame member and means may be provided for securing the mesh to the frame member, such as elastic connection members.

In one possibility the rigid material comprises a plurality of wire mesh segments, and a plurality of frame members may be provided between the segments, and wherein means are provided for elastically connecting the segments to the frame members.

The stiff outer layers may be formed of any suitable building material such as gypsum, aluminum, cement, plywood, paperboard, polymer materials or any other stiff building materials.

The elastic material may be any relatively soft elastic material such as foam or foam-like materials, natural and synthetic rubber and rubber-like materials, fiberglass, elastic polymer materials and the like.

The rigid material may be a metal.

Viewed from another broad aspect of the invention there is provided an acoustic attenuation material comprising two outer layers of a stiff material sandwiching a layer of relatively soft elastic material therebetween, and a plurality of solid particles disposed throughout said elastic material.

The dimensions and material of the particles, and the thickness and material of the elastic layer, are chosen so as to define a plurality of local mechanical resonances at a frequency to be attenuated. The frequency is preferably in the range of 100 to 200 Hz.

Viewed from a still further aspect of the invention there is provided an acoustic attenuation material comprising two outer layers of a stiff material sandwiching a layer of relatively soft elastic material therebetween, and a wire mesh disposed throughout said elastic material.

The wire mesh is preferably parallel to the outer layers.

In this embodiment of the invention the dimensions and material of the mesh, and the thickness and the material of the elastic layer, may be chosen so as to define a plurality of local mechanical resonances at a frequency to be attenuated.

Viewed from a still further broad aspect the present invention provides a method of forming an acoustic attenuation material comprising:

(a) providing two outer layers of a stiff material sandwiching a layer of an elastic material, and (b) providing means within said elastic layer for generating local mechanical resonances at the frequency to be attenuated.

BRIEF DESCRIPTION OF THE DRAWINGS

Some embodiments of the invention will now be described by way of example and with reference to the accompanying drawings, in which.

DETAILED DESCRIPTION OF PREFERRED EMBODIMENTS

Figure 1:
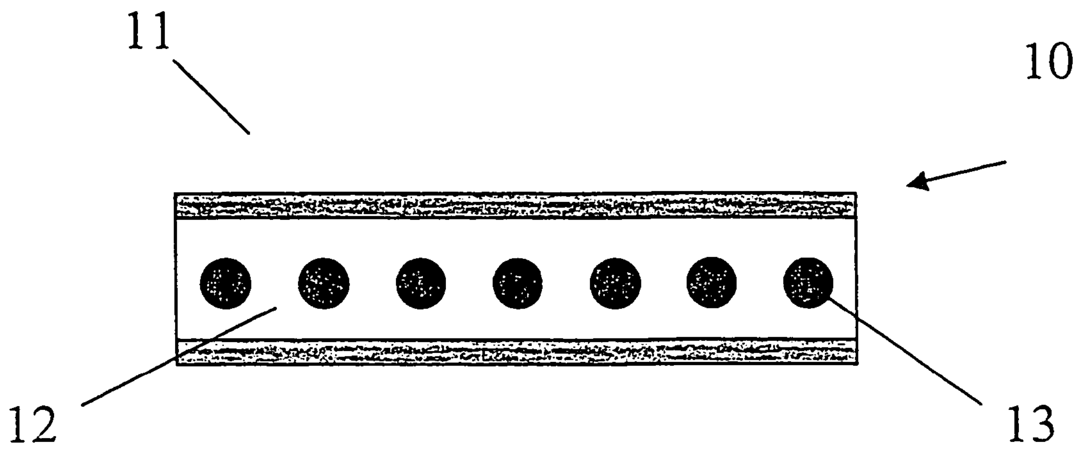
FIG. 1 is a side sectional view through a material according to a first embodiment of the invention.
Figure 2:
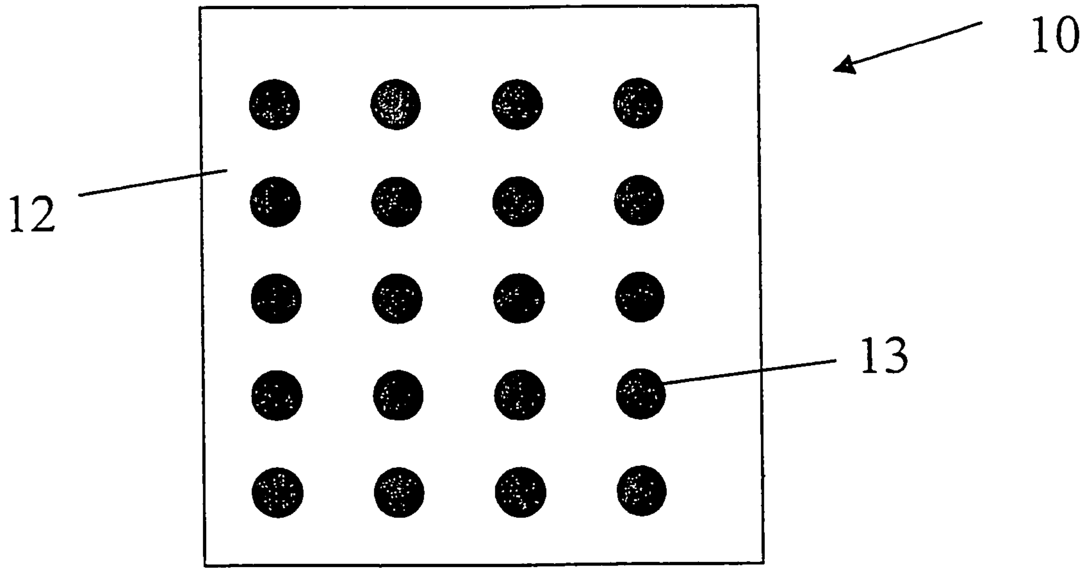
FIG. 2 is a planar sectional view of the material of FIG. 1.

Referring firstly to FIGS. 1 and 2 there is shown a first embodiment of an acoustic attenuation material according to an embodiment of the invention. In this embodiment an acoustic attenuation material 10 comprises two rigid outer layers 11 sandwiching a soft elastic layer 12 within which are located solid particles 13 having a relatively high density and a relatively high rigidity. The particles have a diameter that is preferably 0.1 mm or larger. As can be seen in FIG. 2, the solid particles 13 are located in a regular grid array configuration.

Suitable materials for the rigid outer layers 11 include gypsum, aluminum, cement, plywood, paperboard, rigid polymer materials or any other conventional rigid building materials. The soft elastic layer 12 may be formed of a material such as foam or foam-like materials, natural and synthetic rubber and rubber-like materials, fiberglass, elastic polymer materials and the like. The solid particles 13 may be formed of metal such as lead, steel, iron or aluminum and aluminum alloys.

Figure 3:
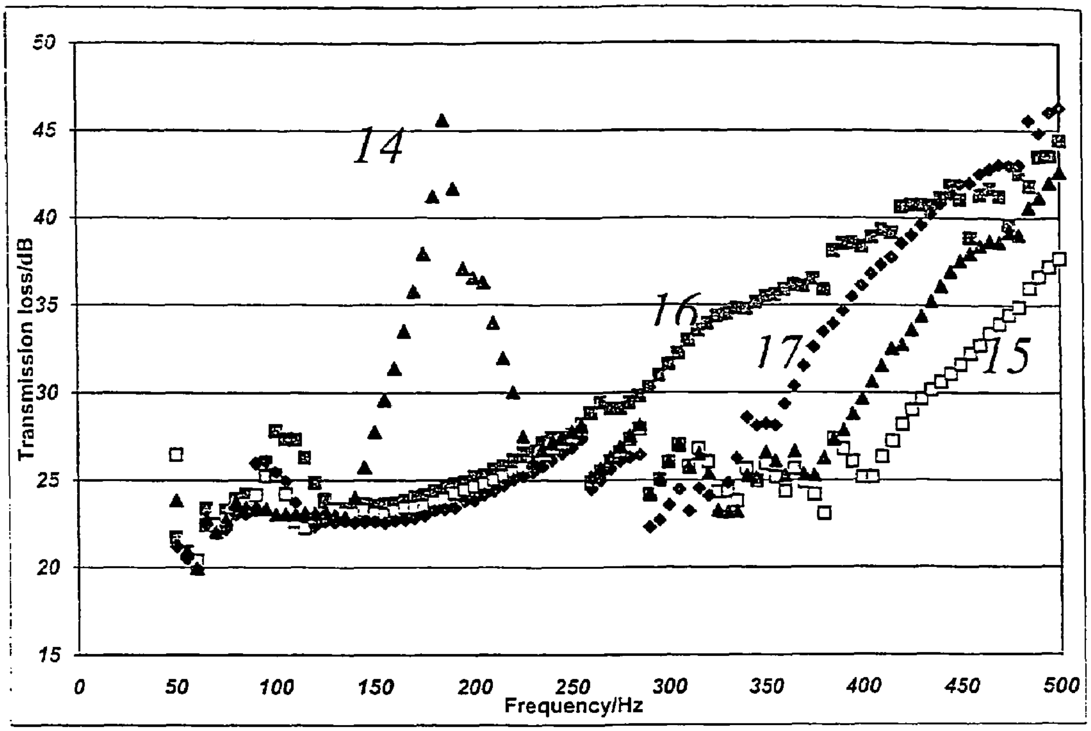
FIG. 3 is a plot showing the low frequency attenuation of materials according to the present invention in comparison with the prior art.

FIG. 3 plots the attenuation against frequency in a low frequency range for an embodiment of the present invention formed in accordance with FIGS. 1 and 2, and with examples of the prior art for reference. In FIG. 3, reference numeral 14 is used to identify the attenuation characteristics for an embodiment of the present invention formed of a 24 mm thick foam layer 12 in which are located 15 mm diameter lead balls 13. The outer rigid layers 11 are formed of two half-inch gypsum boards. The volume filling ratio of the lead balls 13 is 11%. In this embodiment they are dispersed uniformly throughout the foam layer 12, though this is not essential.

As can be seen from FIG. 3, the embodiment of the invention indicated in that Figure by reference numeral 14 has a strong transmission loss that peaks at about 175 Hz. In FIG. 3 reference numeral 15 represents the same structure as this embodiment of the invention but without the lead balls, 16 is a 24 mm thick cement barrier, and 17 is an attenuator formed of two half-inch gypsum boards with a 24 mm air gap therebetween.

Comparing the four materials 14, 15, 16 and 17 it will be seen that at higher frequencies, eg above 250 Hz cement 16 is the best attenuator in terms of performance because it is the most dense. Below about 250 Hz the three prior art configurations 15, 16 and 17 are all significantly less efficient than the embodiment of the invention 14. In particular, at the peak of the absorption of the embodiment of the invention, an extra 20 dB transmission loss can be obtained using the embodiment of the invention.

It is believed that the present invention functions by the generation of built-in local resonances. By combining high-density solid particles within a softer foam matrix, a low frequency mechanical resonance is formed where the solid particles may be regarded as balls and the softer elastic foam represents a spring. When the frequency of the sound approaches the local mechanical resonances and energy is transferred from the impinging sound wave to the balls. Effectively therefore there is a band-gap surrounding the absorption peak corresponding to frequencies that cannot be transmitted through the material.

Figure 4:
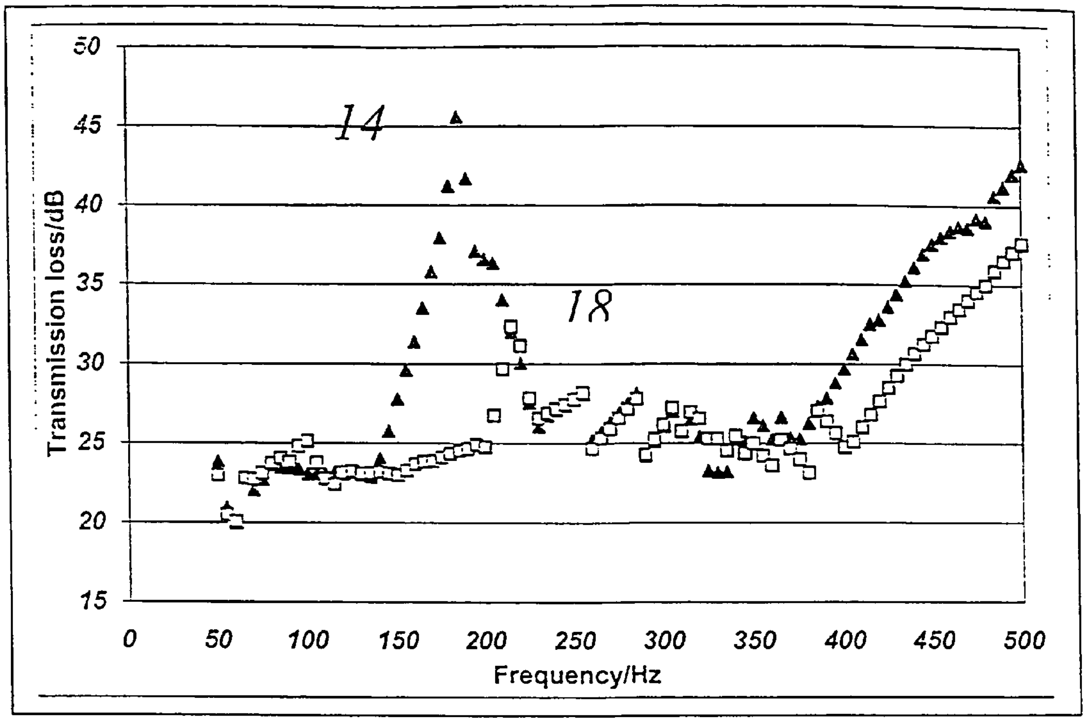
FIG. 4 is a plot illustrating the effect on the attenuation of varying the particle size.
Figure 5:
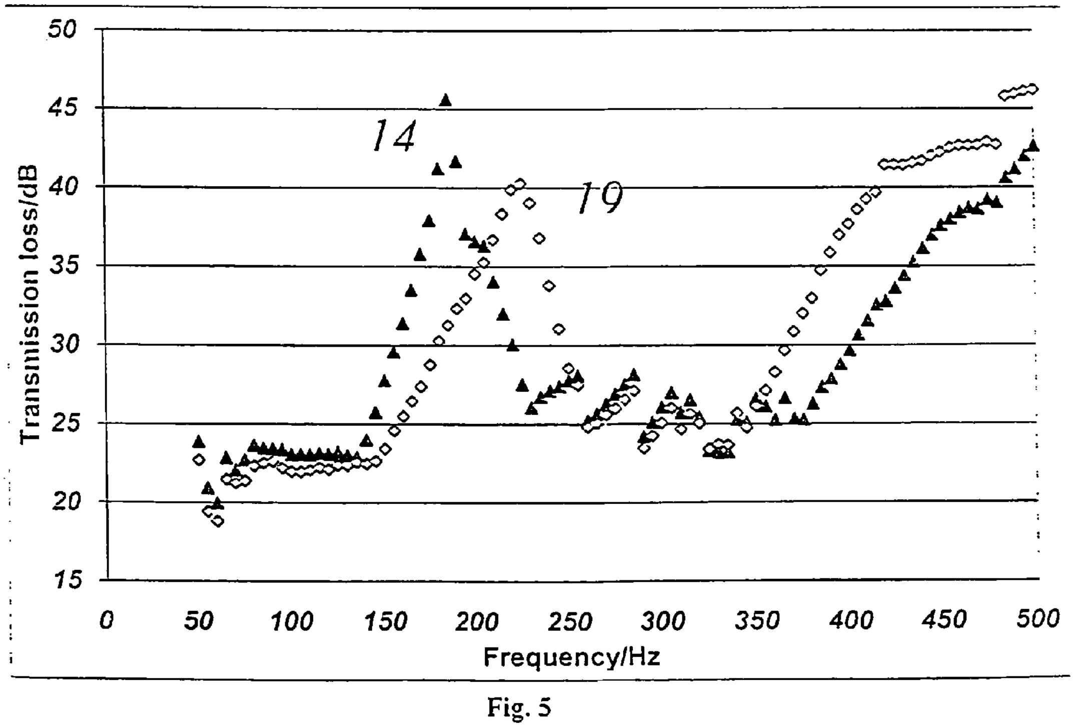
FIG. 5 is a plot illustrating the effect on the attenuation of varying the material thickness.

FIG. 4 shows the same plot as FIG. 3 but with the addition of a new curve 18 that corresponds to another embodiment of the invention. This embodiment is identical to curve 14 but with smaller lead balls 13 that are 10 mm in diameter. It can be seen that in this embodiment the attenuation peak is at a slightly higher frequency (approximately 220 Hz). This is consistent with the theory because with small balls there would be local resonances at higher frequencies. As shown in FIG. 5, the attenuation peak may also be varied by changing the thickness of the foam elastic layer. In FIG. 5 reference numeral 19 refers to an acoustic attenuation material of the same structure as reference numeral 14 but with a thickness of the elastic layer of 19 mm. It will be seen that the attenuation peak is shifted to a slightly higher frequency (approx 220 Hz).

Figure 6:
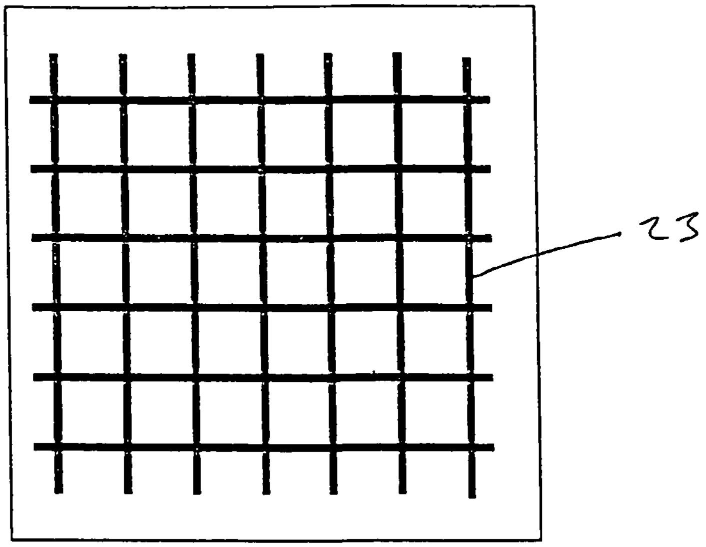
FIG. 6 is a planar sectional view of a material according to a second embodiment of the invention.
Figure 7:
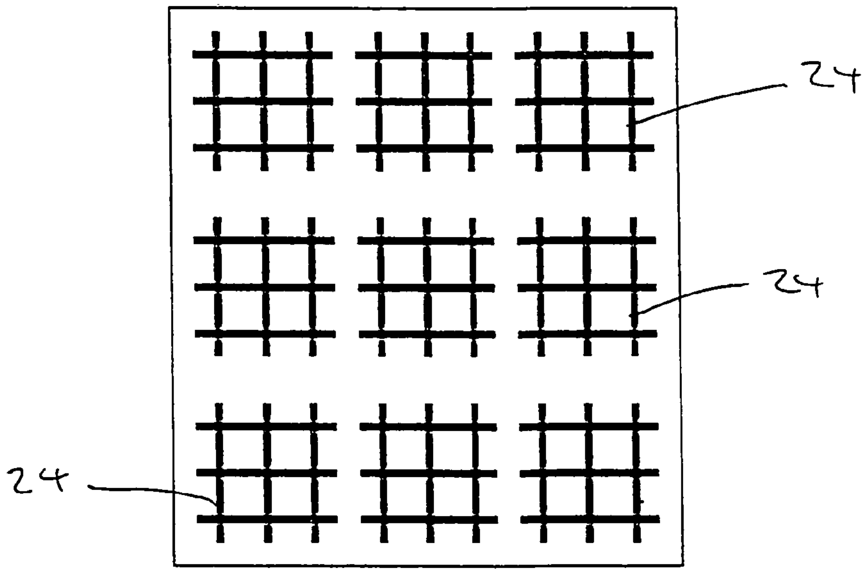
FIG. 7 is a planar sectional view of a material according to a third embodiment of the invention.
Figure 8:
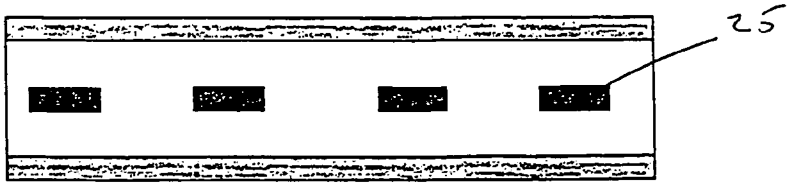
FIG. 8 is a planar sectional view of a material according to a fourth embodiment of the invention.

In the abovedescribed first embodiment of the invention, the solid particles are in the form of solid balls arranged, preferably but not essentially, in a regular grid-like array. In the embodiment of FIG. 6 these balls are replaced by a wire mesh 23, for example of iron with a 6 mm diameter and a filling ratio of 8.5%. FIG. 7 shows a further embodiment in which the wire mesh of FIG. 6 is divided into an array 24 of smaller mesh segments still with a wire diameter of 6 mm and a filling ratio of 5.6%. FIG. 8 shows a still further embodiment in which individual solid particles are provided, but of a different form from the balls of the first embodiment. In the embodiment of FIG. 8 a plurality of disks 25 are provided. These disks, which may be any of the same materials as the balls, may for example have a diameter of 26 mm and a thickness of 3 mm (filling ratio 5%).

Figure 9:
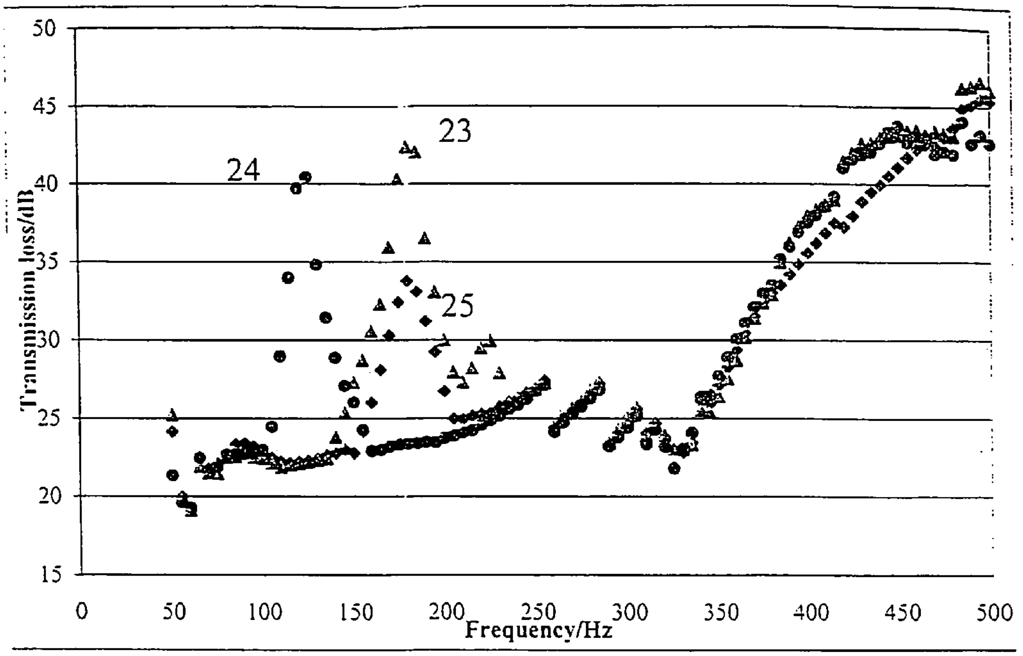
FIG. 9 is a plot illustrating the effect on the attenuation of varying the shape of the particles, and FIGS. 10(*a*) and (*b*) are planar sectional views illustrating variations of the embodiments of FIGS. 6 and 7.

It will be understood that the attenuation characteristics, such as the location and width of the attenuation peak, can be varied by appropriately selecting from parameters such as the shape and configuration of the particles, their size, filling ratio and material. For example, two or more different sizes of balls may be used to obtain more than one resonant frequency and thus a broader attenuation response. Similarly the size of the discs may be varied and two or more sizes may be provided. Effectively therefore the attenuation response of the material of the present invention is “tunable” to provide a desired attenuation characteristic. FIG. 9 shows the attenuation obtainable with the wire mesh 23, wire mesh segments 24 and disks 25 as described above. All these embodiments show good attenuation properties at frequencies between 100 and 200 Hz.

Figure 10:
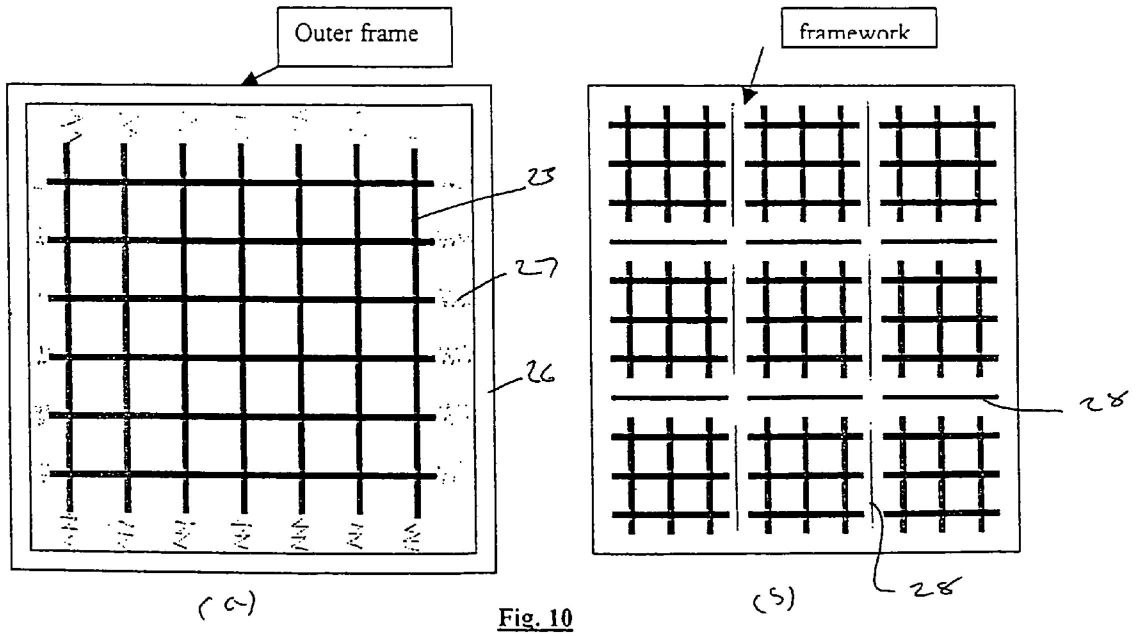

FIG. 10(*a*) shows an embodiment of the material in which the solid particles are constrained from “sinking”, ie shifting position, within the softer elastic material. In this embodiment, in which the solid material is in the form of a wire mesh 23, the mesh 23 is connected at its edges to a surrounding frame 26 by elastic material such as springs 27. Alternatively, as shown in FIG. 10(*b*), especially when either mesh segments 24 are used or when a large number of individual solid particles are provided, individual supporting frame members 28 may be provided within the elastic material.

The present invention, at least in its preferred forms, provides effective low-cost acoustic attenuation materials that may be used effectively at low frequencies that in the prior art would require large and heavy acoustic barriers. The attenuation of the material can be selected by appropriate design of the size and shape of the rigid particles or mesh, the thickness of the elastic layer and the choice of materials. As such the invention can provide materials suitable for a wide range of domestic and industrial applications where noise reduction, especially at low frequencies, is required.

The invention claimed is:

1. An acoustic attenuation material comprising outer layers of a stiff material sandwiching a soft elastic material therebetween, a wire mesh encased within said elastic material for generating local mechanical resonances, wherein said wire mesh is provided with a volume filling ratio within said elastic material of from about 5% to 11%, a surrounding frame member for supporting said mesh, and means for securing said mesh to said frame member.

2. A material as claimed in claim 1 wherein said material is generally planar and said wire mesh lies in the plane of said material.

3. A material as claimed in claim 1 wherein said securing means comprise elastic connection members.

4. A material as claimed in claim 1, comprising a plurality of wire mesh segments within said elastic material.

5. A material as claimed in claim 1 wherein said stiff outer layers are formed of gypsum, aluminum, cement, plywood, paperboard, or polymer materials.

6. A material as claimed in claim 1 wherein said elastic material is selected from foam or foam-like materials, natural and synthetic rubber and rubber-like materials, fiberglass, and elastic polymer materials.

7. A material as claimed in claim 1 wherein said wire mesh is parallel to said outer layers.

8. A material as claimed in claim 1 wherein the dimensions and material of the mesh, and the thickness and the material of the elastic layer, are chosen so as to define a plurality of local mechanical resonances at a frequency to be attenuated.

9. A material as claimed in claim 8 wherein said frequency is in the range 100 to 200 Hz.

10. An acoustic attenuation material comprising outer layers of a stiff material sandwiching a soft elastic material therebetween, a plurality of wire mesh segments encased within said elastic material for generating local mechanical resonances, wherein said wire mesh segments have a volume filling ratio within said elastic material of from about 5% to 11%, a plurality of frame members provided between said segments, and means for elastically connecting said segments to said frame members.

11. An acoustic attenuation material comprising outer layers of a stiff material sandwiching a soft elastic material therebetween, a wire mesh encased within said elastic material for generating local mechanical resonances, a surrounding frame member for supporting said mesh and means for securing said mesh to said frame member.

12. A material as claimed in claim 11 wherein said securing means comprise elastic connection members.

13. An acoustic attenuation material comprising outer layers of a stiff material sandwiching a soft elastic material therebetween, a plurality of wire mesh segments encased with said elastic material for generating local mechanical resonances, a plurality of frame members provided between said segments, and means for elastically connecting said segments to said frame members.

* * * * *